US012768320B2

(12) United States Patent
Spizzirri et al.

(10) Patent No.: US 12,768,320 B2
(45) Date of Patent: Oct. 20, 2026

(54) FUEL INJECTOR FOR A GASEOUS FUEL

(71) Applicant: MARELLI EUROPE S.P.A., Corbetta (IT)

(72) Inventors: Armando Spizzirri, Corbetta (IT); Stefano Petrecchia, Corbetta (IT); Francesco Zampolli, Corbetta (IT); Daniele De Vita, Corbetta (IT)

(73) Assignee: MARELLI EUROPE S.P.A., Corbetta (IT)

(*) Notice: Subject to any disclaimer, the term of this patent is extended or adjusted under 35 U.S.C. 154(b) by 91 days.

(21) Appl. No.: 18/886,589

(22) Filed: Sep. 16, 2024

(65) Prior Publication Data

US 2026/0078722 A1 Mar. 19, 2026

(30) Foreign Application Priority Data

Sep. 19, 2023 (IT) ........................ 102023000019236

(51) Int. Cl.
*F02M 21/02* (2006.01)
*F02M 61/18* (2006.01)

(52) U.S. Cl.
CPC .... *F02M 21/0257* (2013.01); *F02M 21/0251* (2013.01); *F02M 61/1886* (2013.01)

(58) Field of Classification Search
CPC ........... F02M 21/0257; F02M 21/0251; F02M 61/1886
See application file for complete search history.

(56) References Cited

U.S. PATENT DOCUMENTS 2,172,556 A * 9/1939 Edwards ................ F02M 61/08 239/452
4,341,351 A * 7/1982 DeLuca ................. F02M 61/08 239/453

(Continued)

FOREIGN PATENT DOCUMENTS

DE 102014215973 A1 * 2/2016 ......... F02M 21/0269
DE 102014224340 A1 * 6/2016 ............... F16K 1/36

(Continued)

OTHER PUBLICATIONS

Search Report for Italian Patent Application No. 202300019236 dated Mar. 28, 2024.

*Primary Examiner* — Hung Q Nguyen
(74) *Attorney, Agent, or Firm* — Howard & Howard Attorneys PLLC

(57) ABSTRACT

A fuel injector for a gaseous fuel and having: an injection nozzle; a support body with a tubular shape, which is provided with a feeding channel therein, ending in the injection nozzle; an injection valve; a tubular sleeve, which is arranged around an end part of the support body, entirely contains the shutter therein, and ends with the injection nozzle; and an actuator, which is configured to move the shutter. An injection duct, which is created when the injection valve is in the open position, has a converging initial segment, in which an area of the injection duct progressively decreases from a first maximum value at the beginning of the injection duct to a minimum value, and a diverging final segment, in which the area of the injection duct increases from the minimum value until reaching a second maximum value.

22 Claims, 7 Drawing Sheets

(56) References Cited

U.S. PATENT DOCUMENTS

| | | | | |
|---|---|---|---|---|
| 7,451,942 | B2 * | 11/2008 | Borissov | F02M 21/0281 239/584 |
| 2001/0025892 | A1 | 10/2001 | McCoy et al. | |
| 2003/0201344 | A1 * | 10/2003 | Wark | F02M 61/08 239/533.8 |
| 2011/0239991 | A1 * | 10/2011 | Straub | F02M 61/1893 123/476 |
| 2016/0003117 | A1 * | 1/2016 | Cook | F02B 37/24 60/321 |
| 2018/0149116 | A1 * | 5/2018 | Cook | F02M 21/0251 |

FOREIGN PATENT DOCUMENTS

| | | | | | |
|---|---|---|---|---|---|
| DE | 102014224344 | A1 | * | 6/2016 | F02M 21/026 |
| DE | 202023100690 | U1 | | 4/2023 | |
| GB | 2099505 | A | * | 12/1982 | F02M 61/08 |
| GB | 2613396 | A | * | 6/2023 | F02M 61/12 |
| JP | H11280605 | A | * | 10/1999 | F02M 61/18 |
| WO | WO-9111609 | A | * | 8/1991 | |
| WO | 2007087685 | A1 | | 8/2007 | |
| WO | WO-2023110127 | A1 | * | 6/2023 | F02M 61/1893 |

* cited by examiner

FUEL INJECTOR FOR A GASEOUS FUEL

CROSS-REFERENCE TO RELATED APPLICATIONS

This patent application claims priority from Italian patent application no. 102023000019236 filed on Sep. 19, 2023, the entire disclosure of which is incorporated herein by reference.

TECHNICAL FIELD

The present invention relates to a fuel injector for a gaseous fuel.

The present invention is advantageously applied to an electromagnetic hydrogen injector, to which the following discussion will explicitly refer without thereby losing generality.

PRIOR ART

An electromagnetic fuel injector comprises a cylindrical tubular support body equipped with a central feeding channel, which serves as fuel duct and ends with an injection nozzle adjusted by an injection valve controlled by an electromagnetic actuator. The injection valve is provided with a needle, which is moved by the action of the electromagnetic actuator between a closed position and an open position of the injection nozzle against the action of a closing spring which pushes the needle towards the closed position. The needle ends with a shutter adapted to sealingly rest against a valve seat of the injection valve.

The most suitable configuration of a fuel injector for injecting hydrogen provides for the shutter to open outwards so that the closed position of the shutter is not negatively influenced by the pressure which develops in the combustion chamber; namely, when the shutter opens outwards, the pressure which develops in the combustion chamber pushes the shutter towards the closed position and thus it is always ensured that the fuel injector does not have undesired openings caused by a pressure peak in the combustion chamber.

However, a fuel injector having an opening head which opens outwards can only generate a fuel spray concentric to the longitudinal axis of the injector, and this conformation of the fuel spray does not allow optimizing the mixing between the air and the fuel and thus does not allow optimizing the combustion.

Patent application US2001025892A1 describes a supersonic fuel injector for a gaseous fuel, wherein a nozzle for delivering fuel is profiled with converging and diverging sections to accelerate the flow of fuel to a supersonic speed.

Utility model DE202023100690U1 describes a fuel injector for a gaseous fuel and, in particular, for hydrogen, wherein a shutter is separated from a valve seat to create an injection duct through which the gaseous fuel flows and having a converging initial segment and a diverging final segment.

DESCRIPTION OF THE INVENTION

The object of the present invention is to provide a fuel injector for a gaseous fuel which is devoid of the drawbacks described above (namely, allows generating a fuel spray which allows optimizing the mixing between the air and the fuel) and, in particular, is easy and inexpensive to produce.

According to the present invention, a fuel injector for a gaseous fuel is manufactured according to what is stated in the appended claims.

The claims illustrate a preferred embodiment of the present invention being integral part of this description.

BRIEF DESCRIPTION OF THE DRAWINGS

The present invention will now be described with reference to the accompanying drawings, which illustrate a non-limiting example embodiment thereof, wherein.

PREFERRED EMBODIMENTS OF THE INVENTION

Figure 1:
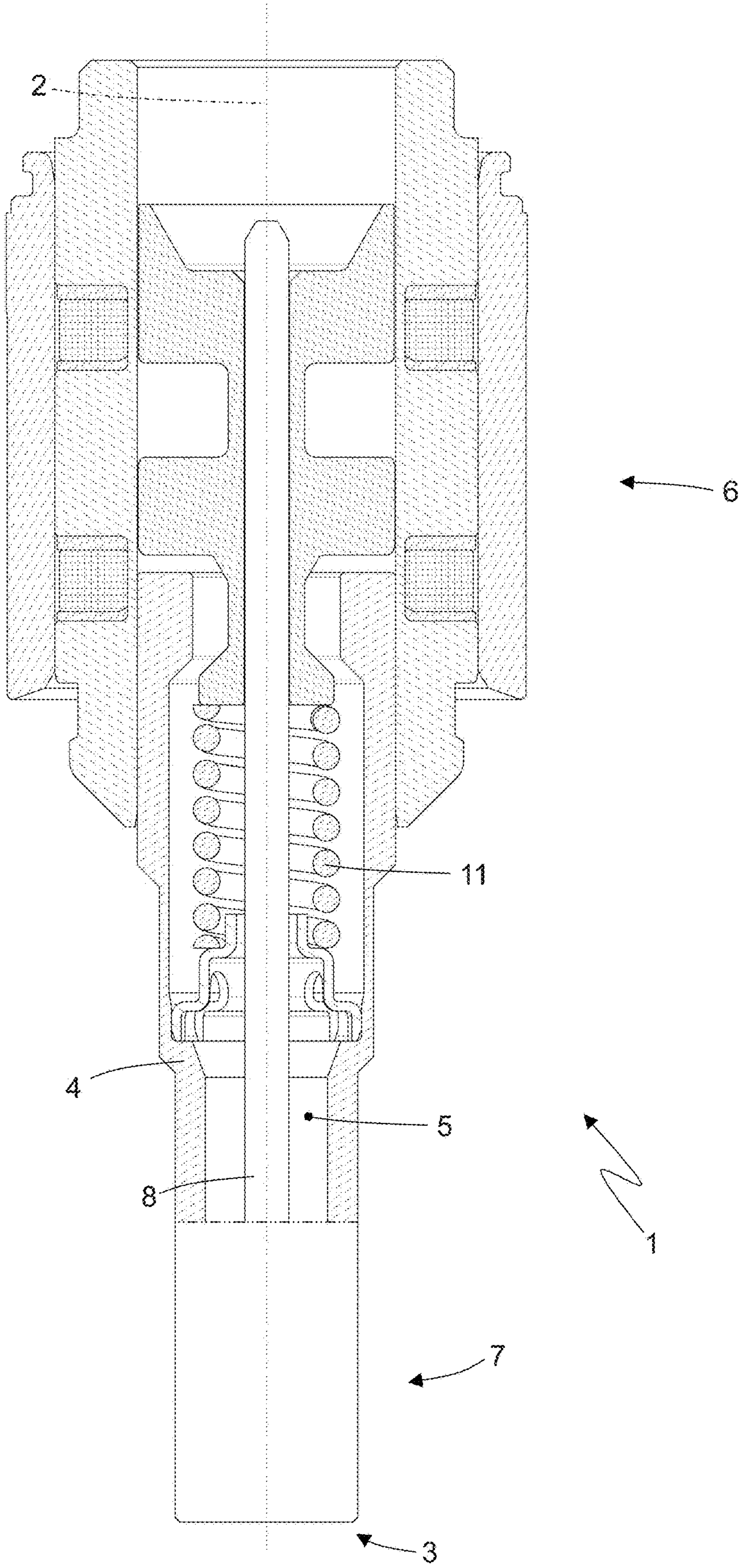
FIG. 1 is a side view, partially in section, of a fuel injector.
Figure 7:
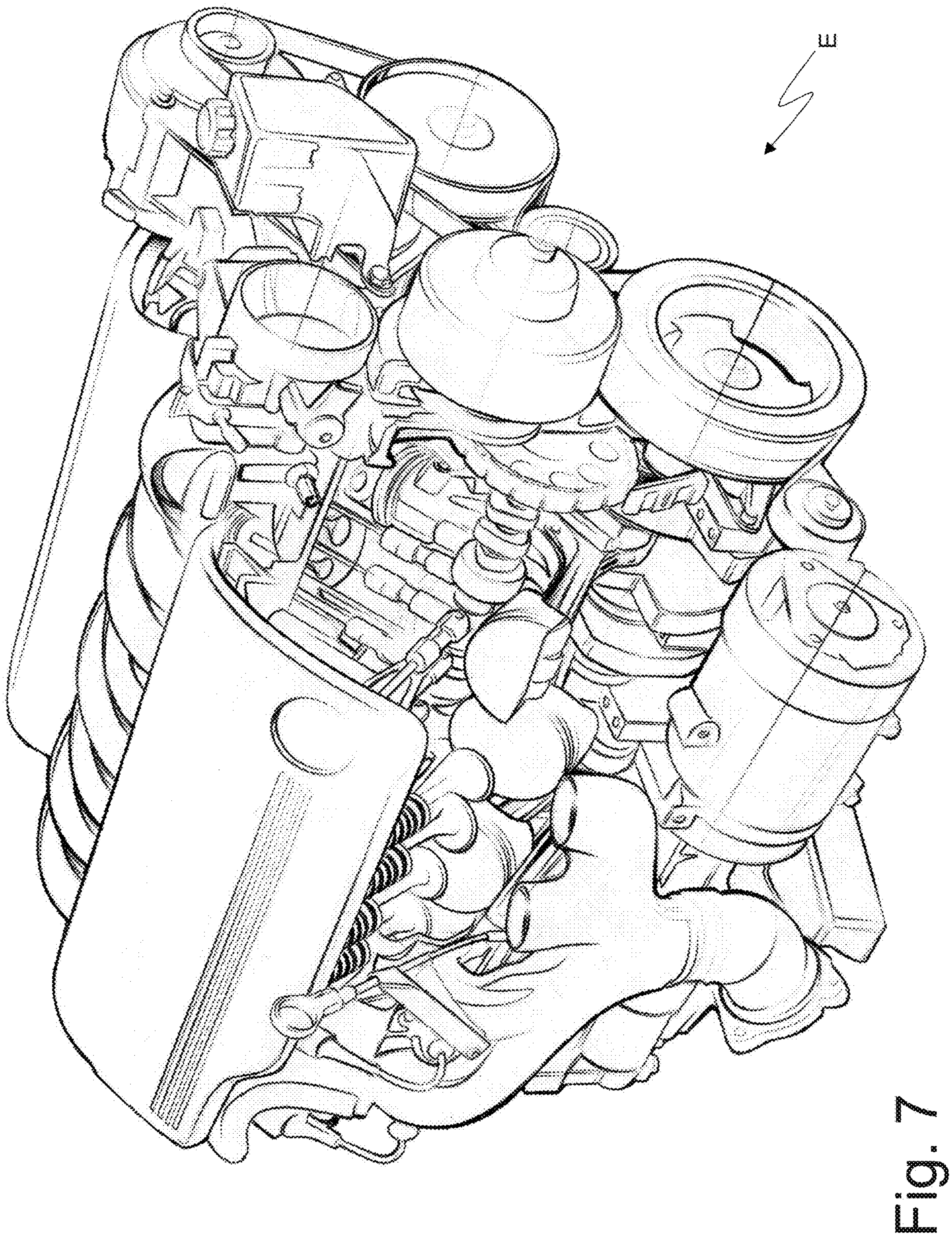
FIG. 7 schematically shows an internal combustion engine which utilizes the fuel injector of FIG. 1.

In FIG. 1, reference numeral 1 indicates, as a whole, a gaseous fuel (in particular hydrogen) injector, which has a cylindrical symmetry around a longitudinal axis 2 and is adapted to be controlled for injecting hydrogen through an injection nozzle 3 that directly leads into a combustion chamber of a cylinder of an internal combustion engine E (schematically illustrated in FIG. 7). Namely, the internal combustion engine E is fed with hydrogen and is provided with an injection system which directly injects hydrogen into a plurality of cylinders by utilizing corresponding hydrogen injectors 1; therefore, the internal combustion engine E comprises at least one cylinder and the injection system which directly injects the hydrogen into the cylinder by utilizing the fuel (fuel) injector 1.

According to what is illustrated in FIG. 1, the fuel injector 1 comprises a support body 4, which has a cylindrical tubular shape with a variable section along the longitudinal axis 2 and has a feeding channel 5 extending along the entire length of the support body 4 for feeding the pressurized hydrogen towards the injection nozzle 3.

The support body 4 houses an electromagnetic actuator 6 at an upper portion thereof and an injection valve 7 (illustrated in detail in FIG. 2) at a lower portion thereof; in use, the injection valve 7 is actuated by the electromagnetic actuator 6 for adjusting the flow of hydrogen through the injection nozzle 3, which is obtained at the injection valve 7. According to a different embodiment not illustrated, the actuator 6 is of piezoelectric type instead of electromagnetic type.

Figure 2:
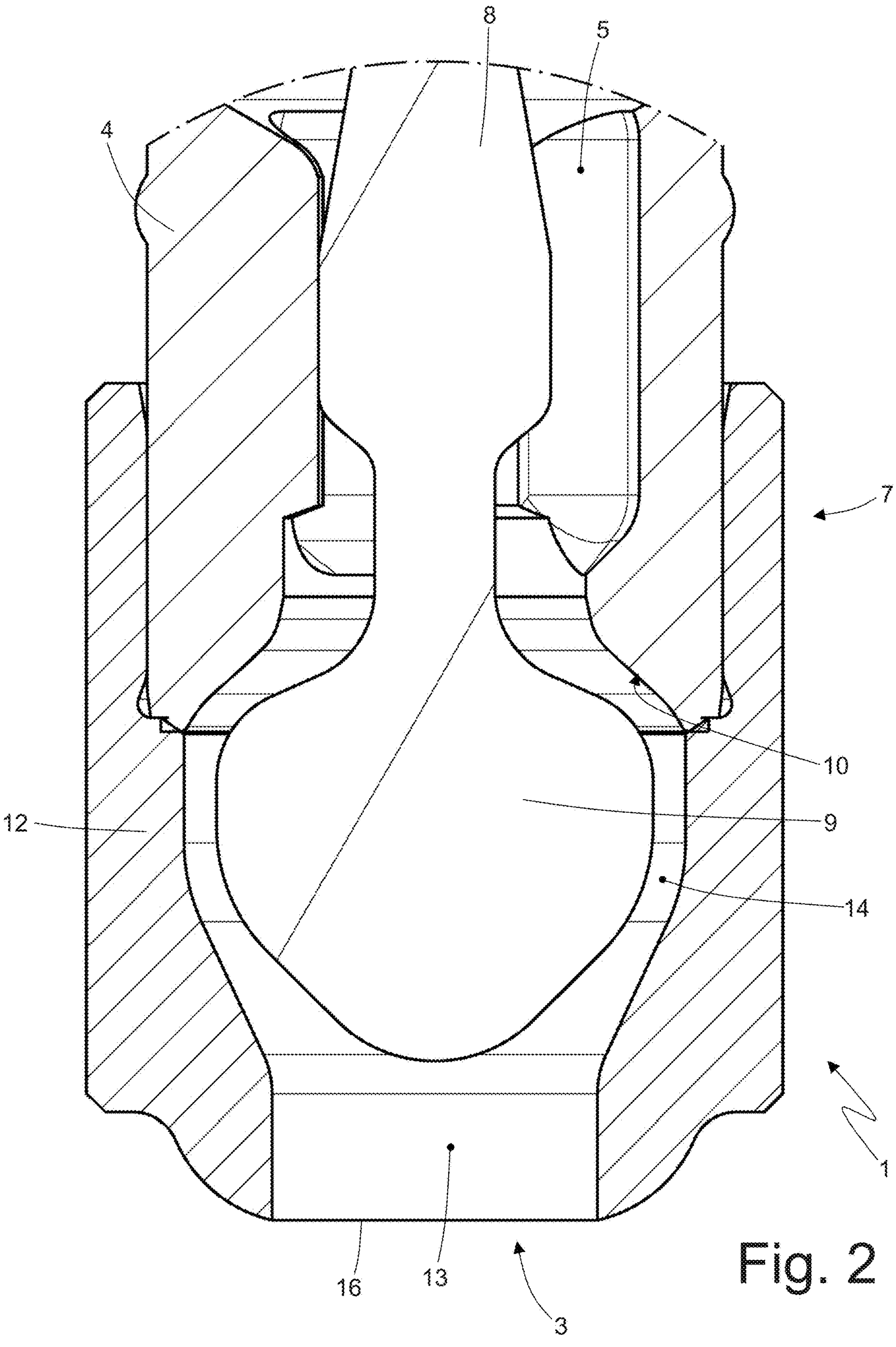
FIG. 2 is a longitudinal sectional view of a final part of the fuel injector of FIG. 1.

The electromagnetic actuator 6 is configured to axially (namely, along the longitudinal axis 2) move a movable unit provided with a needle 8 ending with a shutter 9 (illustrated in FIG. 2). The shutter 9 cooperates with a valve seat 10 (illustrated in FIG. 2) of the injection valve 7 for adjusting the flow of hydrogen through the injection nozzle 3. In other words, the support body 4 ends with a through opening in which the valve seat 10 is defined and which is engaged by the shutter 9. In particular, the electromagnetic actuator 6 is configured to move the shutter 9 between a closed position and an open position of the injection valve 7. Furthermore, the electromagnetic actuator 6 is provided with a closing spring 11 which normally keeps the fuel injector 1 closed, namely which pushes the shutter 9 towards the closed position of the injection valve 7. In other words, the injection valve 7 is normally closed by effect of the closing spring 11 which pushes the needle 8 into the closed position, in which the shutter 9 of the needle 8 presses against the valve seat 10 of the injection valve 7.

According to what is illustrated in FIG. 2, the shutter 9 is arranged externally relative to the support body 4 and is pushed by the closing spring 11 of the electromagnetic actuator 6 against the support body 4; consequently, in order to pass from the closed position to the open position of the injection valve 7, the shutter 9 moves along the longitudinal axis 2 towards the outside of the support body 4, i.e. with a direction concordant with the feeding direction of the hydrogen. In the open position of the injection valve 7 (illustrated in FIG. 2), the shutter 9 is separate from the valve seat 10 creating a passage opening having a crown-shaped section; consequently, the hydrogen which is injected through the injection nozzle 3 has at the outlet an internally hollow conical shape. In other words, the electromagnetic actuator 6 is configured to move the shutter 9 between the closed position of the injection valve 7, in which the shutter 9 is pressed against the valve seat 10, and the open position (illustrated in FIG. 2) of the injection valve 7, in which the shutter 9 is separate from the valve seat 10 for creating the annular opening through which the hydrogen flows.

According to what is illustrated in FIG. 2, around the end part of the support body 4 (namely, at the injection valve 7 and the injection nozzle 3), a tubular sleeve 12 is arranged which entirely contains the shutter 9 therein, and ends with the injection nozzle 3; namely, the injection nozzle 3 is delimited by the sleeve 12, which constitutes the final element of the fuel (fuel) injector 1.

The shutter 9 has, in the embodiment illustrated in FIGS. 2-5, a bulb-like shape and has an outer surface comprising a first portion which faces the valve seat 10 and is shaped so as to be sealingly coupled to an inner surface of the valve seat 10 when the injection valve 7 is in the closed position, and a second portion which faces an inner surface of the sleeve 12 and always remains at a given distance from the inner surface of the sleeve 12. Overall, between an outer surface of shutter 9 and the inner surface of the valve seat 10 and of the sleeve 12, an annular injection duct 14 is delimited, the initial part of which is created when the injection valve 7 is in the open position and along which the fuel flows towards the end zone 13 of the injection duct 14 (namely, towards the injection nozzle 3) when the injection valve 7 is in the open position (illustrated in FIG. 2). More generally, the injection duct 14 is externally delimited (defined) by the inner surface of the valve seat 10 and subsequently by the inner surface of the sleeve 14.

The injection duct 14 which is created (initially between the shutter 9 and the valve seat 10 and the sleeve 12) when the injection valve 7 is in the open position (illustrated in FIG. 2) has a (an everywhere) converging initial segment, in which an area of the injection duct 14 progressively decreases from a first maximum value at the beginning of the injection duct 14 to a minimum value (which is located at the center of the injection duct 14 downstream of the valve seat 10 and corresponds to the throat section) and a (at least initially) diverging final segment in which the area of the injection duct 14 progressively increases from the minimum value until reaching a second maximum value at the end of the injection duct 14 (generally, the second maximum value is greater than the first maximum value).

Preferably, the injection duct 14 has an intermediate segment which is interposed between the (everywhere) converging initial segment and the (at least initially) diverging final segment, has a constant area equal to the minimum value, and has a non-zero axial length.

In other words, the converging initial segment of the injection duct 14 extends from the zone in which the area of the injection duct 14 is equal to the first maximum value to the zone in which the area of the injection duct 14 is equal to the minimum value (namely, the throat section) and thus the intermediate segment begins; whereas, the diverging final segment of injection duct 14 extends from the zone in which the area of the injection duct 14 is equal to the minimum value (namely, the throat section) and thus the intermediate segment ends at least to the zone in which the area of the injection duct 14 is equal to the second maximum value.

According to a preferred embodiment, the (at least initially) diverging final segment of the injection duct 14 is axially longer than the (everywhere) converging initial segment of the injection duct 14 (namely, the hydrogen must travel a greater length for passing through the diverging final segment of the injection duct 14 than the converging initial segment).

Inside the sleeve 12, there is an end zone 13 of the injection duct 14, which is located downstream of the shutter 9 and ends in the injection nozzle 3.

The convergence-divergence alternation in the injection duct 14 constitutes a de Laval nozzle, which is a supersonic exhaust nozzle and is made up of a tube having a central bottleneck, similar to an asymmetric hourglass; its steady-state operation (in which the speed of the hydrogen is equal to the speed of the sound in the throat section, namely, in the smaller section) allows accelerating the hydrogen to supersonic speeds, conveying the exhaust flow so as to transform its thermal and pressure energy into kinetic energy.

In the embodiments illustrated in FIGS. 2-5, the shutter 9 has: an initial portion which is coupled to the valve seat 10 and has, along the longitudinal axis 2, a progressively increasing outer diameter, an intermediate portion having, along the longitudinal axis 2, a constant outer diameter, and an end portion which is closer to injection nozzle 3 and has, along the longitudinal axis 2, a progressively decreasing outer diameter. Whereas, the sleeve 12 has: an initial portion which is arranged immediately downstream of the valve seat 10, is located at the intermediate portion of the shutter 9, and has, along the longitudinal axis 2, a constant inner diameter, an intermediate portion having, along the longitudinal axis 2, a decreasing inner diameter, and an end portion which is closer to the injection nozzle 3, delimits the end zone 13 of the injection duct 14, and has along the longitudinal axis 2 a constant inner diameter.

In the embodiments illustrated in FIGS. 2-5, in the diverging final segment, the area of the injection duct 14 progressively increases from the minimum value until reaching the second maximum value, which is preferably reached at the end of the injection duct 14 (namely, the second maximum value can be reached at the end of the injection duct 14 at the injection nozzle 3 or it can be reached before the end of the injection duct 14 upstream of the injection nozzle 3).

Figure 6:
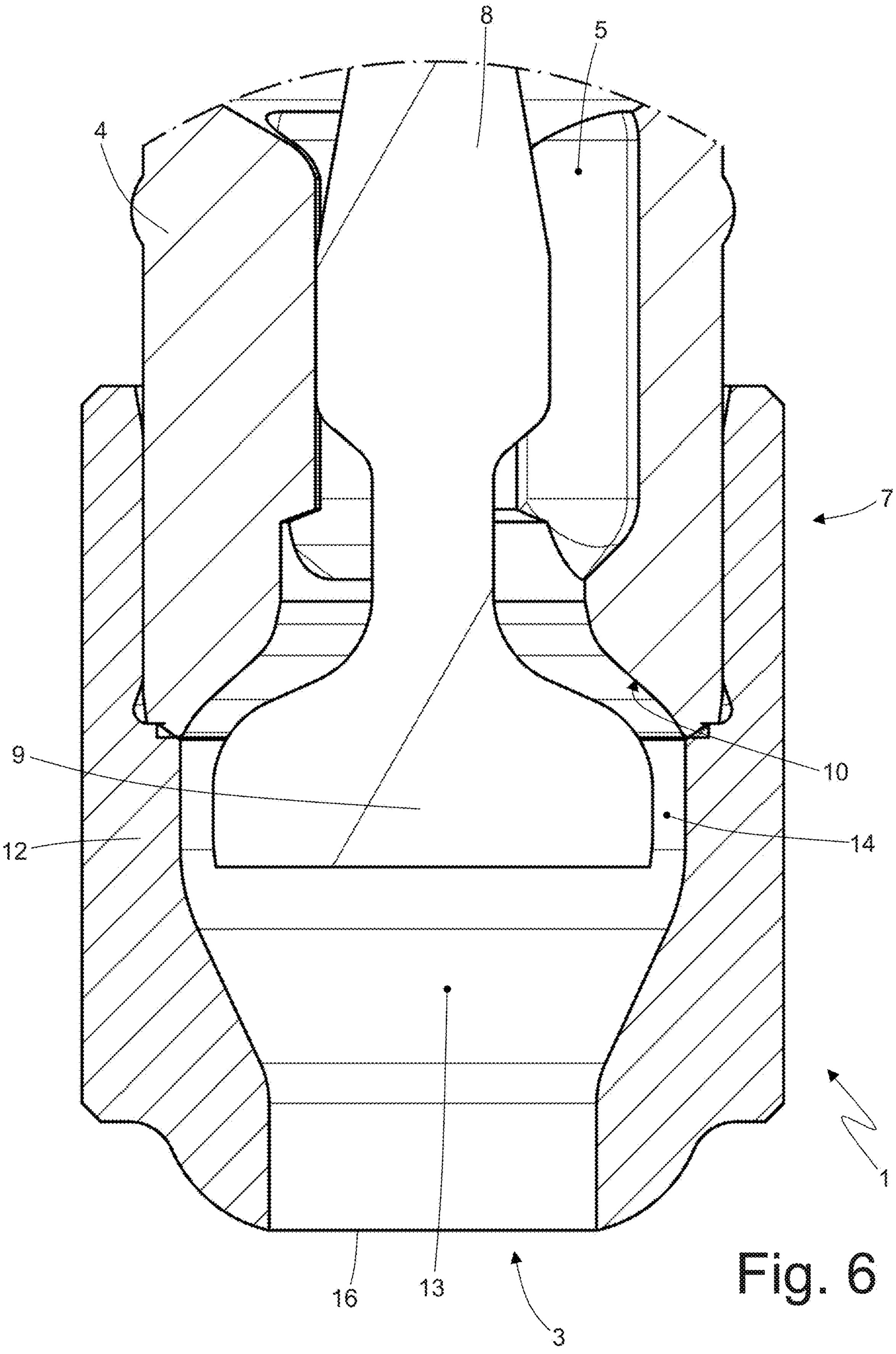

In the alternative embodiment illustrated in FIG. 6, the shutter 9 substantially only has the initial portion which is coupled to the valve seat 10 and has, along the longitudinal axis 2, a progressively increasing outer diameter and the intermediate portion having, along the longitudinal axis 2, a constant outer diameter; namely, in the embodiment illustrated in FIG. 6, the end portion which is closer to the injection nozzle 3 and which has, along the longitudinal axis 2, a progressively decreasing outer diameter, is substantially absent. In fact, in the embodiment illustrated in FIG. 6, the shutter 9 ends with a truncated shape and thus has a lower wall which is closer to the injection nozzle 3 and is flat.

In the alternative embodiment illustrated in FIG. 6, in the diverging final segment, the area of the injection duct 14 increases stepwise from the minimum value to the second maximum value at the flat lower wall of the shutter 9.

In the embodiment illustrated in the accompanying figures, the end zone 13 of the injection duct 14 is coaxial to the longitudinal axis 2 of the fuel (or other gaseous fuel) injector 1, and thus gives the hydrogen spray exiting the injection nozzle 3 an orientation coaxial to the longitudinal axis 2 of the fuel injector 1. According to a different embodiment not illustrated, the end zone 13 of the injection duct 14 is tilted (angled) relative to the longitudinal axis 2 of the fuel injector 1 (namely, the end zone 13 of the injection duct 14 forms an acute angle with the longitudinal axis 2 of the fuel injector 1) and thus gives the fuel spray exiting the injection nozzle 3 a tilted (angled) orientation relative to the longitudinal axis 2 of the fuel injector 1.

Figure 3:
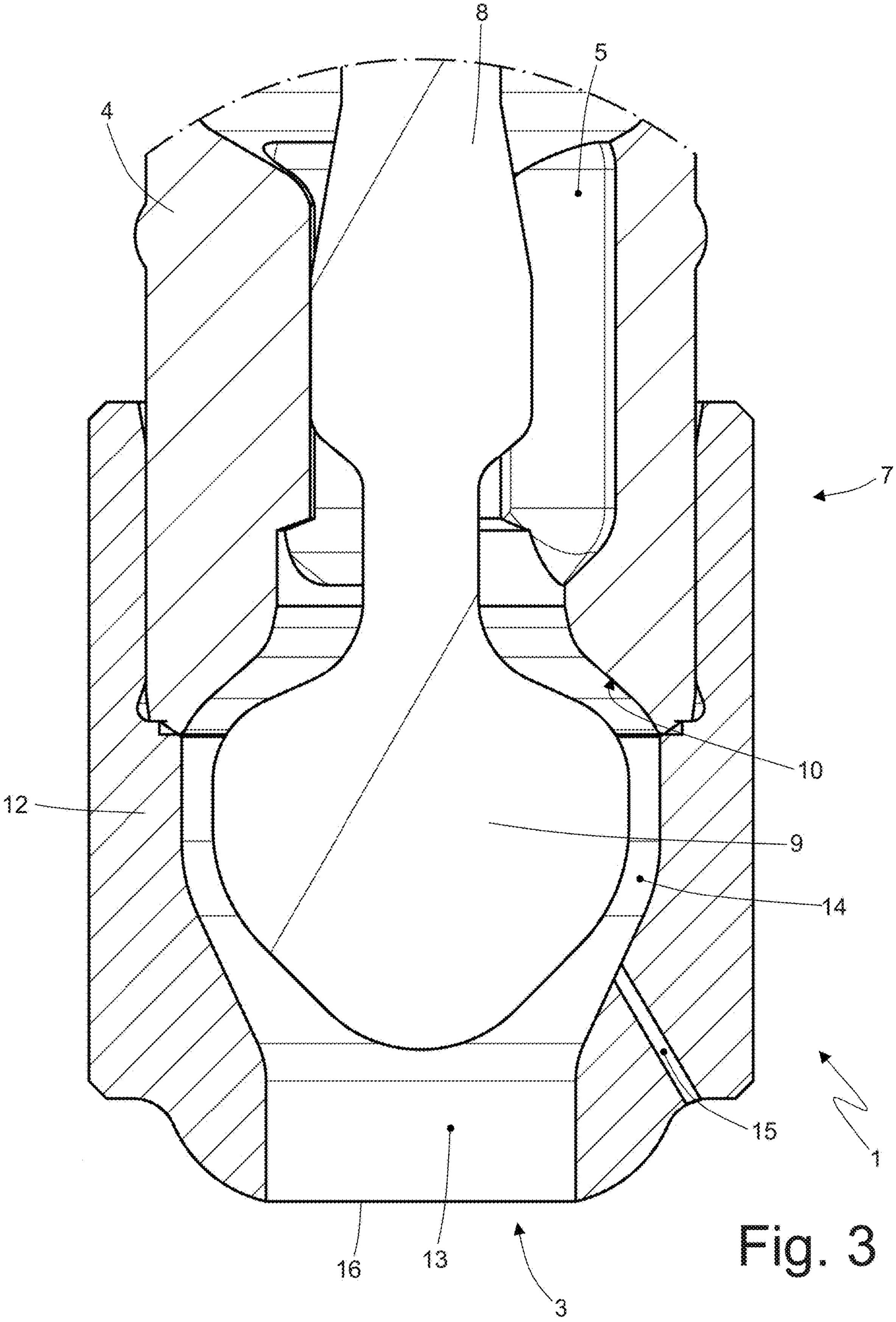
FIGS. 3-6 are three longitudinal sectional views of a final part of respective variations of the fuel injector of FIG. 1.

In the alternative embodiment illustrated in FIG. 3, the sleeve 12 comprises at least one lateral through-duct 15 which goes through the sleeve 12 from side to side and leads into the end zone 13 of the injection duct 14; namely, the lateral duct 15 puts the combustion chamber of a corresponding cylinder (surrounding the final part of the fuel injector 1) in communication with the end zone 13 of the injection duct 14. According to a preferred embodiment, each lateral duct 15 is tilted relative to the longitudinal axis 2 of the fuel injector 1 and forms an acute angle with the longitudinal axis 2 of the fuel injector 1; in particular, the acute angle between each lateral duct 15 and the longitudinal axis 2 of the fuel injector 1 ranges from 20° to 40° and is preferably 30°.

Generally, the sleeve 12 comprises a plurality of lateral ducts 15 which can be arranged along the entire circular extension of the sleeve 12 (namely, they can form a closed circle and thus have a symmetrical distribution around the longitudinal axis 2) or can be arranged only along a limited portion of the circular extension of the sleeve 12 (namely, they can form a circumferential arc and thus have an asymmetrical distribution around the longitudinal axis 2).

The function of the lateral ducts 15 is to allow the suction of air (namely, of comburent) from the combustion chamber of a corresponding cylinder (surrounding the final part of the fuel injector 1) to the end zone 13 of the injection duct 14 in order to allow already on the inside of the end zone 13 of the injection duct 14 a first mixing between the hydrogen (the fuel) and the air (the comburent), and thus improving the overall mixing between the hydrogen and the air. In other words, the presence of the lateral ducts 15 allows improving the overall mixing between the hydrogen (the fuel) and the air (the comburent) present in the combustion chamber of a corresponding cylinder (surrounding the final part of the fuel injector 1).

It is important to note that, as mentioned in the foregoing, the injection duct 14 has an initially converging and subsequently diverging shape (for constituting a de Laval nozzle and thus determines an increase in the speed of the fuel and a decrease in the pressure of the fuel, consequently creating in the end zone 13 of the injection duct 14 a (relative) depression which sucks air from the combustion chamber of a corresponding cylinder (surrounding the final part of the fuel injector 1) through the lateral ducts 15.

If the lateral ducts 15 are symmetrically distributed around the longitudinal axis 2 of the fuel (fuel) injector 1, their presence does not affect the direction of the fuel spray coming out of the injection nozzle 3; whereas, if the lateral ducts 15 are asymmetrically distributed around the longitudinal axis 2 of the fuel injector 1 (i.e. on one side of the sleeve 12 there are more lateral ducts 15 or there are larger lateral ducts 15 than on the opposite side of the sleeve 12), their presence affects the direction of the fuel spray coming out of the injection nozzle 3 and which can thus assume a tilted (angled) direction relative to the longitudinal axis 2 of the fuel (fuel) injector 1. In other words, a non-symmetrical distribution of the lateral ducts 15 relative to the longitudinal axis 2 of the fuel (fuel) injector 1 allows giving the fuel spray coming out of the injection nozzle 3 a tilt relative to the longitudinal axis 2 of fuel (fuel) injector 1.

In order to obtain a fuel spray coming out of the injection nozzle 3 with a given tilt relative to the longitudinal axis 2 of the fuel (fuel) injector 1, it is possible to resort to a non-symmetrical distribution of the lateral ducts 15 relative to the longitudinal axis 2 of the fuel (fuel) injector 1, it is possible to resort (as described in the foregoing) to a tilt of the end zone 13 of the injection duct 14 relative to the longitudinal axis 2 of the fuel (fuel) injector 1, or it is possible to resort to a combination of both of these solutions.

In the embodiment illustrated in FIGS. 2 and 3, an outer edge 16 of the injection nozzle 3 is smooth. In the embodiment illustrated in FIG. 4, the outer edge 16 of the injection nozzle 3 is indented (i.e. has a more or less irregular series of projections and recesses). In other words, the outer edge 16 of the injection nozzle 3 has a series of lobes (which can be more rounded or more pointed) which give the outer edge 16 a sawtooth shape. The indented (uneven, irregular) shape of the outer edge 16 of the injection nozzle 3 allows improving the mixing of the fuel with the air (comburent) as it generates greater turbulences in the fuel spray. Furthermore, the indented (uneven, irregular) shape of the outer edge 16 of the injection nozzle 3 allows reducing the noise (namely, pressure waves in the audible range) which is generated during the fuel spray: the indented shape increases the mixing process and this weakens the formation of large-scale structures (associated with the generation of low-frequency noise falling within the audible range) and excites smaller-scale structures (associated with the generation of high-frequency noise which is outside the audible range).

Figure 4:
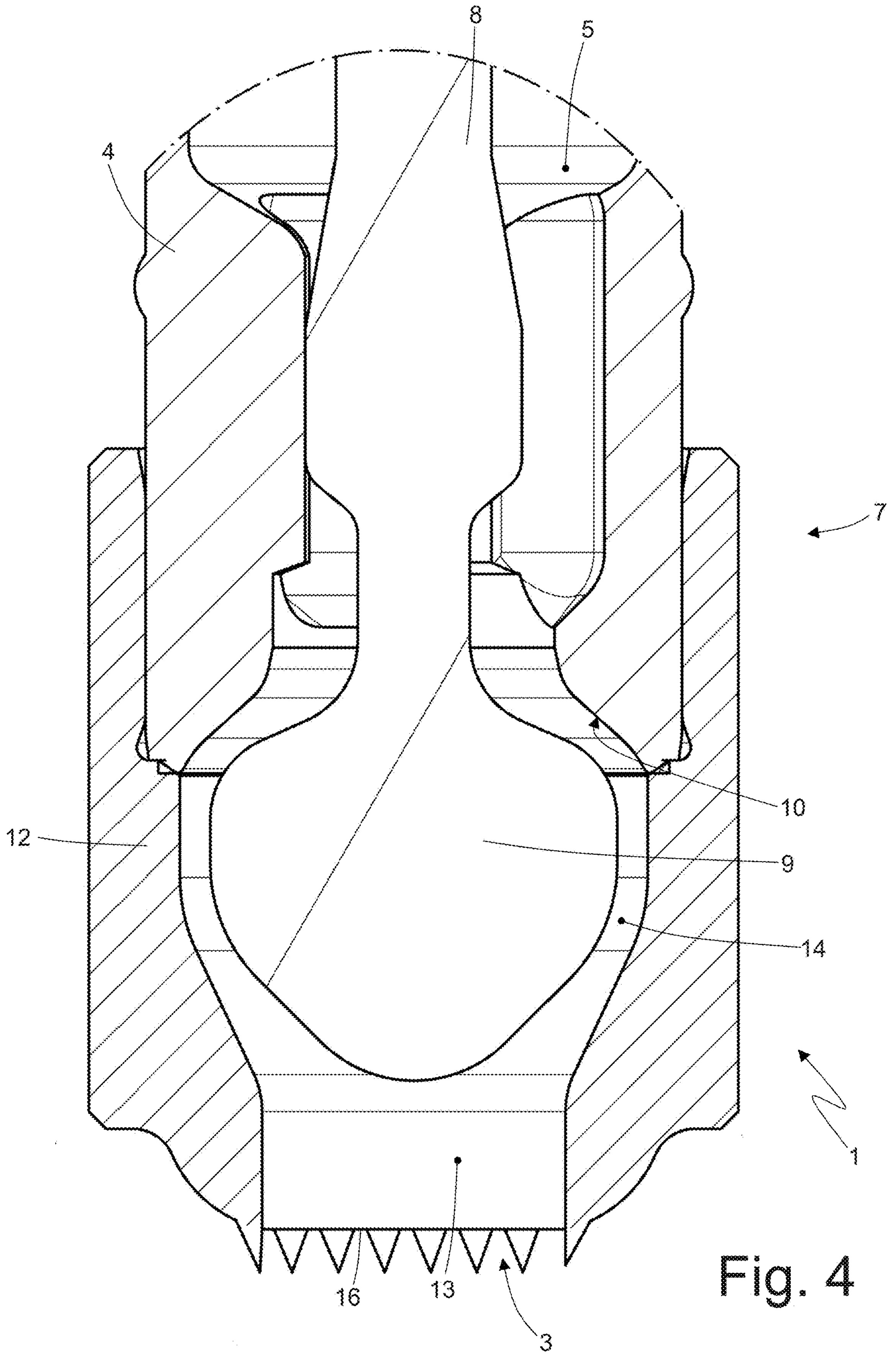
Figure 5:
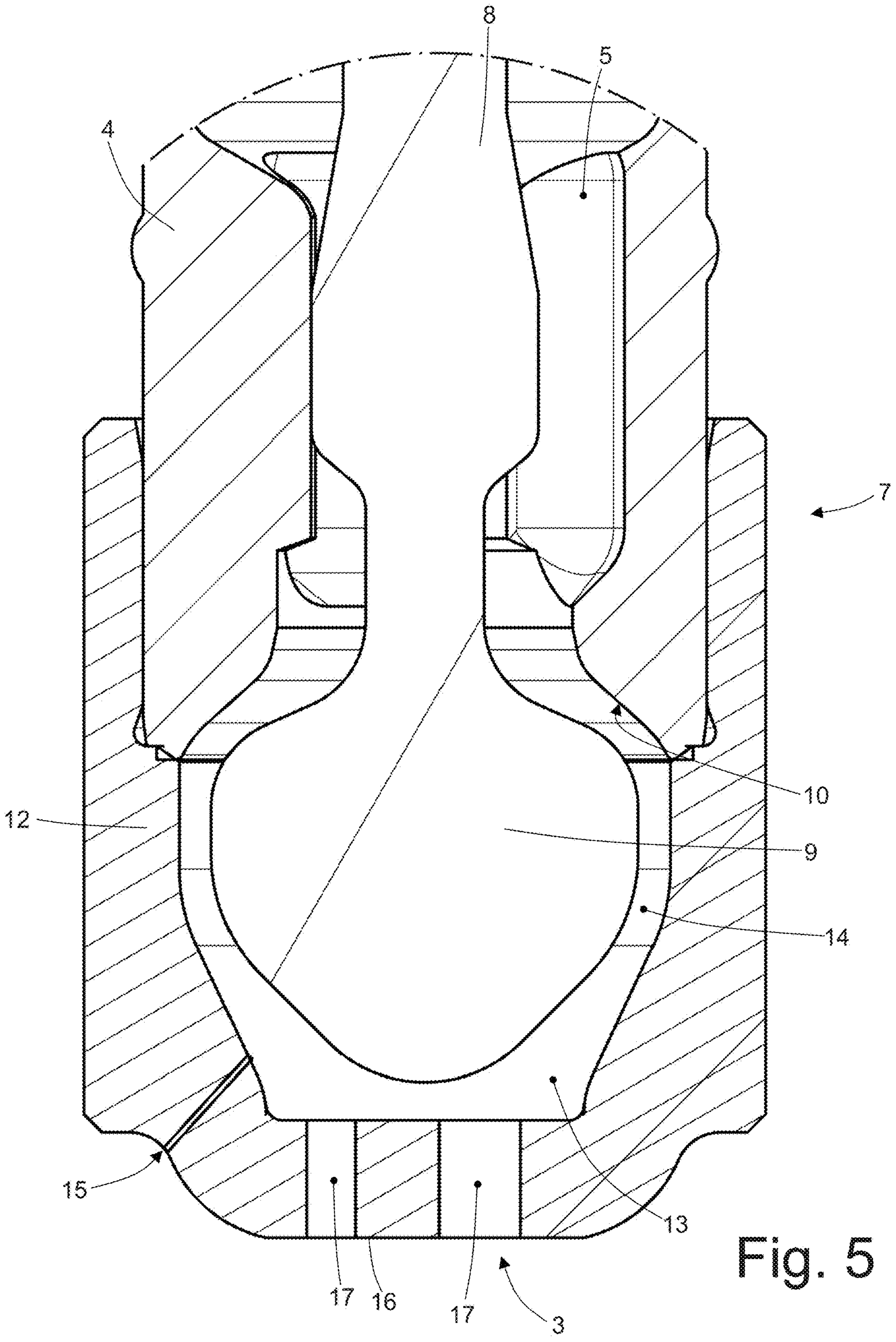

In the embodiment illustrated in FIGS. 2, 3 and 4, the end zone 13 of the injection duct 14 communicates towards the outside (namely, towards the combustion chamber) to inject the fuel by means of one single opening; namely, in the embodiment illustrated in FIGS. 2, 3, and 4, the injection nozzle 3 has one single opening for the injection of the fuel. In the alternative embodiment illustrated in FIG. 5, the end zone 13 of the injection nozzle 14 communicates towards the outside (namely, towards the combustion chamber) to inject the fuel by means of a series of openings 17 which are side by side and may have differentiated sizes (diameters); namely, in the embodiment illustrated in FIG. 5, the injection nozzle 3 has a series of openings 17 which are side by side and may have differentiated sizes (diameters). In other words, in the embodiment illustrated in FIG. 5, a “multi-hole” configuration is provided in which the fuel exits the end zone 13 of the injection duct 14 through a series of openings 17 which are side by side and of different sizes (diameters) which constitute the injection nozzle 3. In the embodiment illustrated in FIG. 5, the openings 17 are parallel to one another, but alternatively they could be tilted (not parallel) with respect to one another.

In the embodiment described above, reference was made to the injection of hydrogen, but the fuel injector 1 can be utilized to inject any other type of gaseous fuel such as, for example, methane.

The embodiments described herein can be combined with one another without departing from the scope of protection of the present innovation.

The fuel injector 1 described above has numerous advantages.

Firstly, the fuel injector 1 described above generates a fuel spray which allows optimizing the mixing between the air (the comburent) and the hydrogen (the fuel). In fact, the fuel injector 1 described above imparts on the hydrogen (fuel) spray a high outlet speed, which facilitates the mixing with the air increasing the swirling motions. Furthermore, the fuel injector 1 described above allows directing the hydrogen (fuel) spray with a certain angle relative to the longitudinal axis 2 of the fuel injector 1, enabling imparting on the fuel spray the optimum direction regardless of the position and orientation of the fuel (fuel) injector 1 in the cylinder crown (tendentially, the fuel spray has to invest the piston laterally and not in the center in order to maximize the turbulences and thus to have a better mixing of the fuel with the air).

Finally, the fuel injector 1 described above results to be simple and inexpensive to produce since it has few constructive differences which are easy to manufacture compared to a similar known hydrogen (fuel) injector.

LIST OF THE REFERENCE NUMBERS OF THE FIGURES

1 fuel injector
2 longitudinal axis
3 injection nozzle
4 support body
5 feeding channel
6 electromagnetic actuator
7 injection valve
8 needle
9 shutter
10 valve seat
11 closing spring
12 sleeve
13 end zone
14 injection duct
15 lateral duct
16 outer edge
17 openings
E internal combustion engine

The invention claimed is:

1. A fuel injector (1) for a gaseous fuel and comprising:

an injection nozzle (3);

a support body (4) with a tubular shape, which has a longitudinal axis (2) and is provided therein with a feeding channel (5) ending in the injection nozzle (3);

an injection valve (7), configured to adjust the gaseous fuel flow through the injection nozzle (3) and provided with a movable shutter (9) arranged outside the support body (4) and with a valve seat (10) obtained in the support body (4);

a tubular sleeve (12), arranged around an end part of the support body (4), entirely contains the shutter (9) therein, and ends with the injection nozzle (3); and an actuator (6), configured to move the shutter (9) between a closed position of the injection valve (7), in which the shutter (9) is pressed against the valve seat (10), and an open position of the injection valve (7), in which the shutter (9) is separate from the valve seat (10);

wherein the shutter (9) comprises a first portion which faces the valve seat (10) and is shaped so as to be sealingly coupled to an inner surface of the valve seat (10) when the injection valve (7) is in the closed position, and a second portion which faces an inner surface of the sleeve (12) and always remains at a given distance from the inner surface of the sleeve (12);

wherein the inner surface of the valve seat (10) and the inner surface of the sleeve (12) delimit an annular injection duct (14), an initial part of which is created when the injection valve (7) is in the open position and along which the gaseous fuel flows towards the injection nozzle (3) when the injection valve (7) is in the open position;

wherein the injection duct (14), which is created when the injection valve (7) is in the open position, has a converging initial segment, in which an area of the injection duct (14) progressively decreases from a first maximum value at the beginning of the injection duct (14) to a minimum value, and an at least initially diverging final segment, in which the area of the injection duct (14) increases from the minimum value until reaching a second maximum value.

2. The fuel injector (1) according to claim 1, wherein the injection duct (14) has an intermediate segment that is interposed between the converging initial segment and the diverging final segment, has a constant area equal to the minimum value and has a non-zero axial length to separate the initial segment from the final segment.

3. The fuel injector (1) according to claim 1, wherein inside the sleeve (12) there is an end zone (13) of the injection duct (14), which is located downstream of the shutter (9) and ends in the injection nozzle (3).

4. The fuel injector (1) according to claim 3, wherein the end zone (13) of the injection duct (14), which is located downstream of the shutter (9), is coaxial to the longitudinal axis (2) of the fuel injector (1).

5. The fuel injector (1) according to claim 3, wherein the end zone (13) of the injection duct (14), which is located downstream of the shutter (9), is tilted relative to the longitudinal axis (2) and forms an acute angle with the longitudinal axis (2).

6. The fuel injector (1) according to claim 3, wherein the sleeve (12) comprises at least one lateral through-duct (15) which goes through the sleeve (12) from side to side, and leads to the end zone (13) of the injection duct (14) which is located downstream of the shutter (9).

7. The fuel injector (1) according to claim 6, wherein the lateral duct (15) is tilted relative to the longitudinal axis (2) and forms an acute angle with the longitudinal axis (2).

8. The fuel injector (1) according to claim 7, wherein the acute angle between the lateral duct (15) and the longitudinal axis (2) ranges from 20° to 40°.

9. The fuel injector (1) according to claim 6, wherein the sleeve (12) comprises a plurality of lateral ducts (15), which are symmetrically distributed around the longitudinal axis (2).

10. The fuel injector (1) according to claim 6, wherein the sleeve (12) comprises a plurality of lateral ducts (15), which are asymmetrically distributed around the longitudinal axis (2).

11. The fuel injector (1) according to claim 10, wherein on a side of the sleeve (12) there are more lateral ducts (15) or there are larger lateral ducts (15) than on the opposite side of the sleeve (12).

12. The fuel injector (1) according to claim 1, wherein an outer edge (16) of the injection nozzle (3) is indented and has a series of projections and recesses.

13. The fuel injector (1) according to claim 1, wherein the diverging final segment of the injection duct (14) is axially longer than the converging initial segment of the injection duct (14).

14. The fuel injector (1) according to claim 1, wherein the convergence-divergence alternation in the injection duct (14) constitutes a supersonic de Laval nozzle.

15. The fuel injector (1) according to claim 1, wherein the shutter (9) only and exclusively comprises:

an initial portion which is coupled to the valve seat (10) and has, along the longitudinal axis (2), a progressively increasing outer diameter; and an intermediate portion having, along the longitudinal axis (2), a constant outer diameter.

16. The fuel injector (1) according to claim 1, wherein the shutter (9) ends with a truncated shape and has a lower wall which is closer to the injection nozzle (3) and is flat.

17. The fuel injector (1) according to claim 1, wherein in the diverging final segment the area of the injection duct (14) increases stepwise from the minimum value to the second maximum value.

18. The fuel injector (1) according to claim 1, wherein the shutter (9) has a bulb-like shape and comprises:

an initial portion which is coupled to the valve seat (10) and has, along the longitudinal axis (2), a progressively increasing outer diameter;

an intermediate portion having, along the longitudinal axis (2), a constant outer diameter; and an end portion, which is closer to the injection nozzle (3) and has, along the longitudinal axis (2), a progressively decreasing outer diameter.

19. The fuel injector (1) according to claim 18, wherein, in the diverging final segment the area of the injection duct (14) progressively increases from the minimum value until reaching the second maximum value.

20. The fuel injector (1) according to claim 1, wherein the inner surface of the sleeve (12) comprises:

an initial portion having, along the longitudinal axis (2), a constant inner diameter;

an intermediate portion having, along the longitudinal axis (2), a decreasing inner diameter; and an end portion, which is closer to the injection nozzle (3) and has, along the longitudinal axis (2), a constant inner diameter.

21. The fuel injector (1) according to claim 1, wherein the injection nozzle (3) provides for a series of openings (17) which are side by side and may have differentiated sizes.

22. The fuel injector (1) according to claim 1, wherein the second maximum value is greater than the first maximum value.

* * * * *